United States Patent
Smith et al.

(10) Patent No.: US 11,383,454 B2
(45) Date of Patent: Jul. 12, 2022

(54) WIND TURBINE BLADE MANUFACTURE

(71) Applicant: Vestas Wind Systems A/S, Aarhus N. (DK)

(72) Inventors: Jonathan Smith, Burridge (GB); John Rimmer, Southampton (GB)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/284,844

(22) PCT Filed: Oct. 16, 2019

(86) PCT No.: PCT/DK2019/050316
§ 371 (c)(1),
(2) Date: Apr. 13, 2021

(87) PCT Pub. No.: WO2020/078519
PCT Pub. Date: Apr. 23, 2020

(65) Prior Publication Data
US 2021/0387426 A1    Dec. 16, 2021

(30) Foreign Application Priority Data

Oct. 18, 2018   (DK) ............................ PA 2018 70680

(51) Int. Cl.
*B29C 65/78*    (2006.01)
*B29C 65/48*    (2006.01)
*B29L 31/08*    (2006.01)

(52) U.S. Cl.
CPC .......... *B29C 65/7814* (2013.01); *B29C 65/48* (2013.01); *B29C 65/7832* (2013.01); *B29L 2031/085* (2013.01)

(58) Field of Classification Search
CPC . B29C 65/7814; B29C 65/48; B29C 65/7832; B29C 33/301; B29C 65/7808;
(Continued)

(56) References Cited

U.S. PATENT DOCUMENTS 8,328,516 B2 * 12/2012 Santiago ............... F03D 1/0675
416/88
10,677,215 B2 * 6/2020 Hayden .................. F03D 1/0675
(Continued)

FOREIGN PATENT DOCUMENTS

DE     19833869 C1    3/2000
EP      2033769 A1    3/2009
(Continued)

OTHER PUBLICATIONS

Danish Patent and Trademark Office, Search and Examination Report in PA 2018 70680, dated Mar. 22, 2019.
(Continued)

*Primary Examiner* — Ryan J. Walters
(74) *Attorney, Agent, or Firm* — Wood Herron & Evans LLP

(57) ABSTRACT

Improvements relating to wind turbine blade manufacture A method of making wind turbine blades of variable length is described. The method involves forming first and second half shells of a main blade section in a main blade mould assembly. A pre-manufactured tip section is selected from a plurality of tip sections of different lengths according to a total length requirement for the wind turbine blade. The tip section is supported adjacent to the main blade mould assembly such that an inboard end of the tip section overlaps with an outboard end of one of the half shells of the main blade section. The main mould assembly is then closed to bond the two main half shells together and to bond the tip section to the main blade half shells. The invention allows blades of different overall length to be produced using a common main blade mould assembly.

14 Claims, 7 Drawing Sheets

(58) Field of Classification Search
CPC .............. B29C 65/7844; B29C 66/547; B29C 66/7212; B29C 66/8412; B29C 70/443; B29C 70/84; B29C 70/887; B29L 2031/085; F05B 2240/307; Y02E 10/72; Y02P 70/50; F03D 1/0675; B29D 99/0028
See application file for complete search history.

(56) References Cited

U.S. PATENT DOCUMENTS

| | | | |
|---|---|---|---|
| 10,730,251 B2 * | 8/2020 | Kirkeby | ................ B29C 70/541 |
| 2011/0076149 A1 | 3/2011 | Santiago et al. | |
| 2012/0061024 A1 | 3/2012 | Starke | |
| 2018/0009177 A1 * | 1/2018 | Bendel | .................... B29C 65/48 |
| 2018/0216601 A1 | 8/2018 | Yarbrough et al. | |
| 2021/0387294 A1 * | 12/2021 | Henrichsen | ........ B29D 99/0028 |

FOREIGN PATENT DOCUMENTS

| | | |
|---|---|---|
| EP | 2316629 A1 | 5/2011 |
| EP | 2749765 A1 | 7/2014 |
| WO | 2018184644 A1 | 10/2018 |

OTHER PUBLICATIONS

European Patent Office, International Search Report and Written Opinion in PCT Application No. PCT/DK2019/050316, dated Jan. 17, 2020.

* cited by examiner

WIND TURBINE BLADE MANUFACTURE

TECHNICAL FIELD

The present invention relates generally to wind turbine blades, and more specifically to a method for making wind turbine blades of variable length.

BACKGROUND

Wind turbines harness the kinetic energy of wind imparted on turbine blades to rotate a rotor and drive a generator producing electrical energy. The amount of energy collected by the rotor is known to be largely proportional to the wind velocity and swept area of the rotor, and therefore also to the length of the rotor blades. Wind farms comprising a plurality of wind turbines are commonly situated in locations which provide favourable conditions for harnessing wind power. Though it can be said that in general wind farm sites are selected based on factors such as average annual wind speed, considerable variations exist between the wind conditions in different wind farms.

Further, wind conditions within a single wind farm may vary considerably between the specific locations of the individual wind turbines within the wind farm. In some cases, wind farms may span large distances wherein geographical factors such as the topography of surrounding areas may result in different wind conditions at different locations within the same wind farm. Additionally, wind conditions for a turbine at a location on the perimeter of a wind farm may be very different to the wind conditions experienced by a wind turbine located in the centre of a wind farm. Amongst other factors, this may in part be due to turbulence or wake effects caused by other wind turbines within the wind farm. For example, wind turbines located upwind in a wind farm may remove some of the kinetic energy from the wind before the wind reaches a downwind turbine in the same wind farm.

It is commonplace for a wind farm to be made up of wind turbines of a specific class, the wind turbines having been selected based on the average conditions across the whole wind farm. Therefore, a typical wind farm may comprise a plurality of wind turbines all of the same size and specification. Due to the aforementioned variations in wind characteristics for both wind farms and individual turbines, it is unlikely that every wind turbine in a wind farm is optimised for the specific location at which it is situated. It therefore follows that increases in annual energy production of a wind turbine and of a wind farm can be achieved by individual optimisation of each wind turbine according to the specific conditions at the wind turbine site within the wind farm. Such optimisation would for example be possible by providing different wind turbines in the site with blades of different lengths. The lengths of the blades may be optimally selected according to the wind conditions at the site.

Modern utility scale wind turbines may typically comprise rotor blades with a length greater than 50 meters. The blades are typically moulded using correspondingly-large moulds. These moulds are very expensive to produce and occupy a significant proportion of the factory floorspace in a blade production facility. It is therefore prohibitive in terms of cost and efficiency to have several different moulds each of a slightly different size to make blades with optimal length for each wind turbine site.

Against this background, it is an object of the present invention to provide a more economically efficient method of making wind turbine blades of various lengths, so that the length of the blade can be optimised according to site-specific conditions.

SUMMARY OF THE INVENTION

According to an aspect of the present invention there is provided a method of making a wind turbine blade having a main blade section and a tip section connected together. The method comprises: providing a main blade mould assembly comprising first and second female main mould halves shaped to form first and second half shells of the main blade section respectively, each main mould half having an inboard end shaped to define a radially inboard portion of the main blade section and an outboard end shaped to define a radially outboard portion of the main blade section, the main blade mould assembly having an open position in which the main mould halves are spaced apart, and a closed position in which the main mould halves are brought together. The method comprises forming a first half shell of the main blade section in the first main mould half and forming a second half shell of the main blade section in the second main mould half with the main blade mould assembly in the open position. The method comprises selecting a tip section from a plurality of tip sections of different lengths according to a total length requirement for the wind turbine blade. The method further comprises arranging the tip section adjacent to the outboard end of the first main mould half such that an inboard end of the tip section and an outboard end of the first half shell overlap; closing the main mould assembly such that the first and second half shells are brought together and such that the inboard end of the tip section and an outboard end of the second half shell overlap; bonding the first and second half shells together and simultaneously bonding the inboard end of the tip section to the outboard ends of the first and second half shells with the main mould assembly in the closed position.

The invention enables blades of different overall length to be formed using the same main blade mould assembly by selecting tip sections of different lengths according to the total length requirement for the blade. The total length requirement of the wind turbine blade may be a site-specific parameter and may depend upon the particular conditions at the specific site at which a wind turbine comprising the blade is to be installed. These conditions may include the characteristics of the prevailing wind at the site, and/or the energy generation requirements for the wind turbine. As discussed by way of background, the wind conditions at a specific wind turbine site may be affected by other wind turbines in the same wind farm, for example taking into account wake effects from nearby turbines. The invention provides a cost-effective way of making blades having slightly different lengths according to site-specific requirements. Therefore, various wind turbines in a wind farm may each have blades with substantially identical main blade sections, but with tip sections of different lengths.

The main blade section comprises an inboard section of the blade. Preferably the main blade section comprises a root end of the wind turbine blade. The tip section preferably comprises the tip of the wind turbine blade. Alternatively, a separate tip may be attached to the tip section to form the blade tip. A separate tip may be a metal tip which may form part of a lightning-protection system of the blade.

The main blade section preferably makes up at least 70% of the total length of the wind turbine blade. The tip section preferably makes up 30% or less of the total length of the blade. Accordingly, the joint between the main blade section and the tip section is preferably in an outboard portion of the blade, outboard from a spanwise midpoint of the blade.

The first and second main half shells preferably have a laminate structure and may be formed of composite materials, for example glass and/or carbon fibres integrated with a resin matrix. One or more spar caps may be attached to the shells or preferably embedded within the laminate structure of the shells. The spar cap(s) may be made from carbon fibre and preferably comprise stacks of pultruded strips.

The tip section preferably comprises an outer shell defining a substantially hollow interior. The shell preferably has a similar structure to the main blade section, for example it may have a laminate structure and be formed of composite materials such as glass and/or carbon fibre in a resin matrix. The tip section may further comprise spar caps attached to the shell or integrated in the shell. If spar caps are included in the tip section, these preferably have substantially the same structure as the spar caps of the main blade section.

The method may further comprise arranging the tip section such that the inboard end of the tip section is supported by the outboard end of the first mould half and such that an outboard end of the tip section extends beyond the outboard end of the first mould half. The method may further comprise supporting the outboard end of the tip section relative to the first main mould half using a support structure that is preferably separate from the first main mould half. A separate support structure is a structure that is not involved in shaping the main blade section. Accordingly, a separate support structure includes a support structure that may still be attached to the main mould assembly.

The tip section and the support structure may each comprise datum features and the method may further comprise aligning and/or engaging the datum features of the tip section with the datum features of the support structure to ensure a correct alignment between the tip section and the first half shell. The support structure may comprise a plurality of datum features including datum features specific to tip sections of different length. Accordingly, the same support structure can be used to support and accurately align tip sections of different length.

The outboard ends of the first and second main mould halves may be truncated in comparison to a conventional blade mould assembly. A conventional blade mould assembly is shaped to form the full length of a wind turbine blade, i.e. from root to tip, whereas the truncated mould assembly does not include an outboard portion configured to form the tip end of the blade.

The tip section may comprise an outer shell that tapers in thickness at the inboard end of the tip section. The method may further comprise forming the first and second half shells such that their respective outboard ends taper in thickness, and arranging the tip section such that the tapered inboard end of the tip section and the tapered outboard end of the first half shell overlap.

The inboard end of the tip section may form a cup and cone joint with the main blade section upon closing the main mould assembly. In this case a scarf joint is effectively formed between the shell of the tip section and the shell of the main blade section. The scarf joint extends around the perimeter of the inboard end of the tip section and the outboard end of the main blade section.

The method may further comprise providing adhesive on an inner surface of the outboard end of the first main half shell and arranging the inboard end of the tip section on top of the adhesive. The method may additionally comprise providing further adhesive on an inner surface of the outboard end of the second main half shell and/or on an outer surface of the inboard end of the tip section configured to overlap the second main half shell prior to closing the main mould assembly.

The method may comprise bonding a shear web between respective inner surfaces of the first and second main half shells. The shear web may be bonded along one edge to the inner surface of the first main half shell with the main blade mould assembly in the open position. Adhesive may then be applied to an opposite edge of the shear web prior to closing the mould. This adhesive then serves to bond the shear web to the second half shell when the mould is closed. Alternatively, the shear web could first be bonded to the second half shell before being bonded to the first half shell upon closing the main mould assembly. Further adhesive is preferably also applied along the leading and trailing edges of the first and/or second main half shells prior to closing the main mould assembly. This adhesive serves to bond the first and second half shells together when the mould is closed.

The tip section may include one or more components selected from: a shear web, lighting-protection components, anti-icing component, de-icing components, which are pre-installed in the tip section prior to arranging the tip section relative to the first main half shell. The method may comprise joining the shear web of the tip section to a shear web of the main blade section. The method may comprise connecting anti-icing components, de-icing components and/or lighting protection components of the tip section with an anti-icing system, a de-icing system and/or a lightning protection system of the main blade section.

The method may further comprise making the plurality of different tip sections in a plurality of respective tip moulds of varying length, the tip moulds being separate to the main blade mould assembly.

The method may alternatively comprise making the selected tip section using an adjustable tip mould that is adjustable to form tip sections having a variety of lengths. In this case, the method may comprise configuring the adjustable tip mould to form a tip section having a length selected in accordance with the total length requirement for the wind turbine blade.

The adjustable tip mould may comprise a shell layup area having an inboard spanwise section of substantially constant dimensions. The method of making the selected tip section may comprise arranging a plant in the inboard spanwise section to adjust the effective length of the shell layup area.

In summary, the present invention provides a method of making wind turbine blades of variable length. The method involves forming first and second half shells of a main blade section in a main blade mould assembly. A pre-manufactured tip section is selected from a plurality of tip sections of different lengths according to a total length requirement for the wind turbine blade. The tip section is supported adjacent to the main blade mould assembly such that an inboard end of the tip section overlaps with an outboard end of one of the half shells of the main blade section. The main mould assembly is then closed to bond the two main half shells together and to bond the tip section to the main blade half shells. The invention allows blades of different overall length to be produced using a common main blade mould assembly.

The present invention also provides a wind turbine blade made according to the method described above.

BRIEF DESCRIPTION OF THE DRAWINGS

The present invention will now be described in further detail by way of non-limiting example only with reference to the following figures in which.

DETAILED DESCRIPTION

Figure 1:
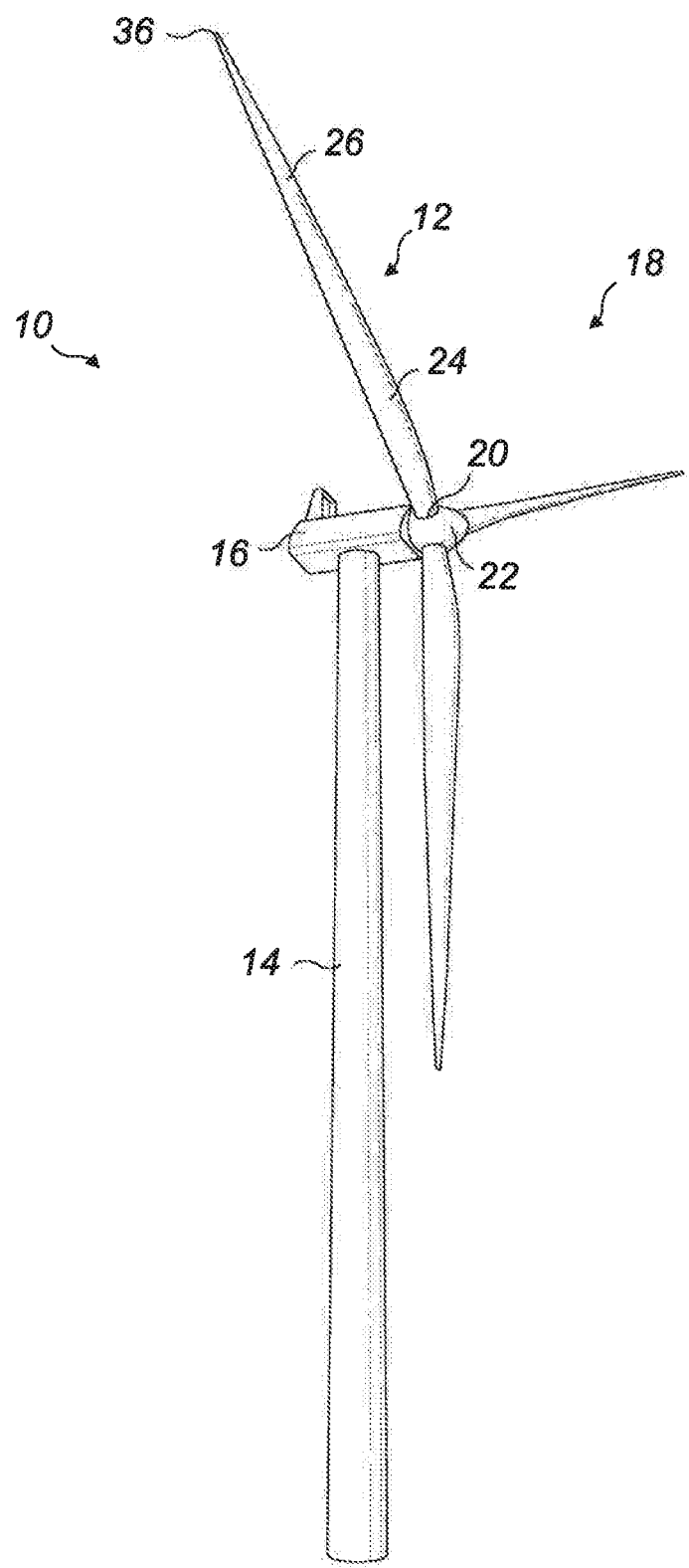
FIG. 1 is a schematic perspective view of a wind turbine comprising wind turbine blades manufactured according to the method of the present invention.

FIG. 1 is a schematic perspective view of a modern utility-scale wind turbine 10 comprising rotor blades 12 made in accordance with an embodiment of the present invention. The wind turbine 10 comprises a tower 14 supporting a nacelle 16 and a rotor 18 is mounted to the nacelle 16. The rotor 18 comprises a plurality of radially extending wind turbine blades 12, which are each attached at their respective root 20 to a central hub 22. In this example, the rotor 18 comprises three blades 12, but in other embodiments the rotor 18 may have any number of blades 12.

The blades 12 each comprise a main blade section 24 and a tip section 26. The main blade section 24 is a radially-inboard section of the blade 12. The tip section 26 is a radially-outboard section of the blade 12. In this example, the main blade section 24 comprises the root 20.

A method of making wind turbine blades 12 of varying length will now be described with reference to the remaining figures.

Figure 2:
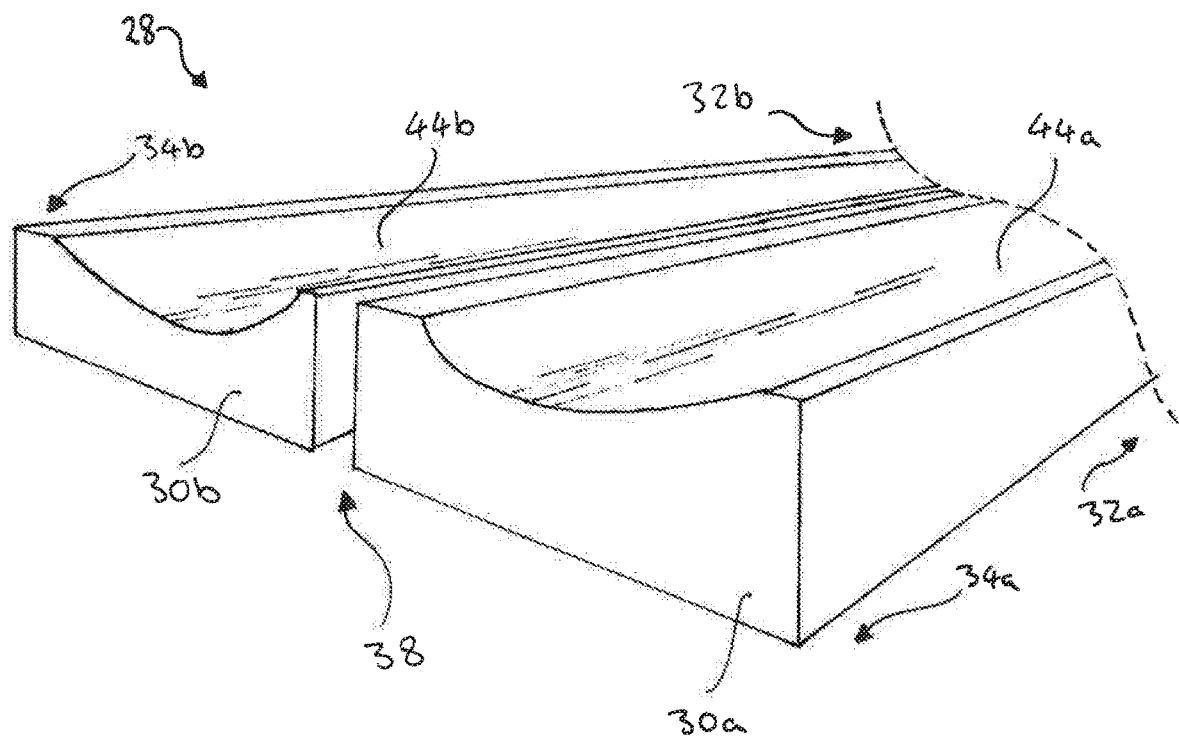
FIG. 2 is a schematic perspective view of a main blade section mould assembly comprising first and second main mould halves.

FIG. 2 is a schematic perspective view of a main blade mould assembly 28 configured for making a main blade section 24. The main blade mould assembly 28 comprises first and second female mould halves 30a, 30b and is shown in an open position in which the first and second mould halves 30a, 30b are arranged side-by side and spaced apart. Each mould half 30a, 30b has an inboard end 32a, 32b (a majority of which is not shown in FIG. 2) and an outboard end 34a, 34b. The inboard ends 30a, 30b are shaped to form an inboard portion of the main blade section 24, e.g. a root 20 of the blade 12, and the outboard ends 34a, 34b are shaped to form an outboard portion of the main blade section 24.

In contrast to conventional blade mould assemblies that are shaped to form the full length of a wind turbine blade, i.e. from the blade root 20 to the blade tip 36, the mould assembly 28 shown in FIG. 2 is truncated at its outboard end 38, such that it does not form a tip end of the blade 12.

Figure 3:
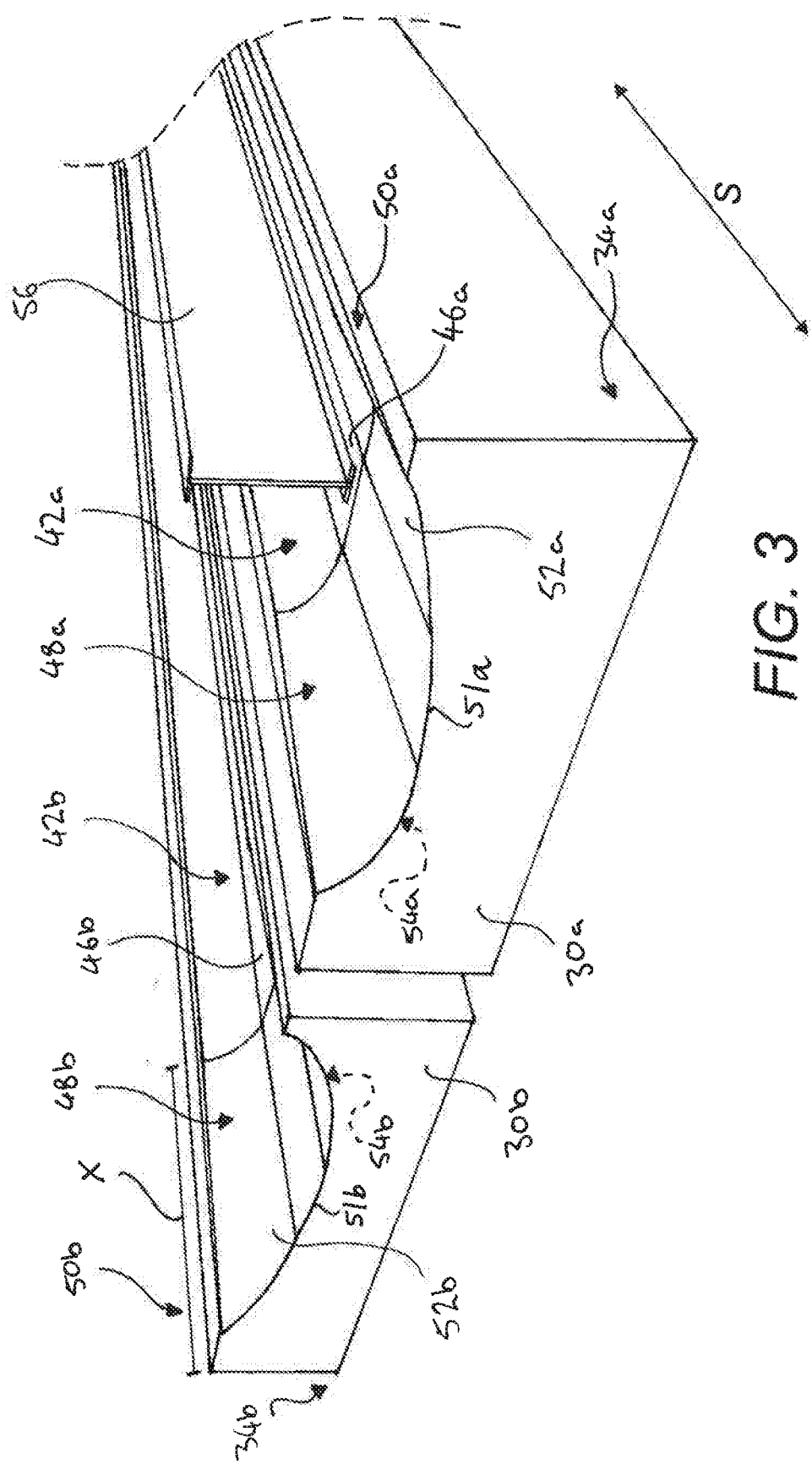
FIG. 3 is a schematic perspective view of first and second half shells of the main blade section in the mould assembly.

As shown in FIG. 3, the first and second mould halves 30a, 30b are used respectively to form first and second half shells 42a, 42b of the main blade section 24. The half shells 42a, 42b of the main blade section 24 of the wind turbine blade 12 in this example have a laminate structure and are formed of composite materials. The half shells 42a, 42b may be formed using a conventional lay-up process, in which plies of fibrous material such as glass fibres are arranged in the first and second half moulds 30a, 30b on a mould surface 44a, 44b (shown in FIG. 2) of the respective half mould 30a, 30b. Further structural layers may be arranged on top of the fibrous plies in certain regions of the mould 30a, 30b if required. These further structural layers may comprise materials such as foam or balsa wood core panelling to provide additional structural rigidity to a half shell 42a, 42b. Further fibrous plies may then be arranged on top of the further structural layers. In this example, a load bearing spar cap 46a, 46b is also incorporated within the laminate structure of the shells 42a, 42b. The spar cap 46a, 46b is preferably of composite construction, and is preferably formed of carbon-fibre reinforced plastic (CFRP). In the present embodiment the spar caps 46a, 46b are formed by stacking pultruded strips of CFRP in the mould 30a, 30b.

In the present embodiment, the various layers of the half shells 42a, 42b are arranged in the mould halves 30a, 30b to form a tapered portion 48a, 48b at an outboard end 50a, 50b of each main blade section half shell 42a, 42b. The tapered portions 48a, 48b extend for a distance X in a spanwise direction S of each half shell 42a, 42b. Throughout the tapered portion 48a, 48b, a thickness of the composite lay-up perpendicular to the mould surface 44a, 44b reduces towards an outboard edge 51a, 51b of the mould halves 30a, 30b. The tapered portions 48a, 48b may be formed using ply drops when laying up the half shells 42a, 42b. For example, the layers of the laminate may be laid up in the mould 30a, 30b such that they terminate at different spanwise locations to achieve a tapering thickness. Alternatively or additionally, the layers may themselves taper in thickness.

In the present embodiment the laminate lay-ups of the first and second half shells 42a, 42b are arranged in the same configuration, i.e. with the thickness of the composite lay-up reducing towards the outboard edge 51a, 51b of the mould halves 30a, 30b. This creates a tapered inner surface 52a, 52b at the outboard end 50a, 50b of the half shells 42a, 42b. It will be appreciated that other tapered configurations may be equally applicable and the invention is not limited to the specific taper configuration shown in FIG. 3. For example, in other embodiments a tapered plant (not shown) may be arranged at the outboard end 34a, 34b of one or both of the mould halves 30a, 30b before the composite layers are arranged on the mould surface 44a, 44b. This would result in a tapered outer surface 54a, 54b of the half shells 42a, 42b.

After laying up the half shells 42a, 42b in their respective mould halves 30a, 30b, the layups may be covered with a vacuum film to create a sealed region between the film and the mould surfaces 44a, 44b encapsulating the layups. In a case where dry fibrous plies are used in the layups, a resin infusion process may be implemented in which resin is introduced into the sealed region under vacuum pressure. Alternatively, if pre-preg materials are used in the layup an infusion process may not be required. The composite lay-ups are then cured by application of heat and/or pressure to form the first and second main blade section half shells 42a, 42b. After the main blade section half shells 42a, 42b are formed, a shear web 56 may be bonded to the inner surface 52a of the first half shell 42a. Alternatively, the shear web 56 may be bonded to the inner surface 52b of the second half shell 42b. The shear web 56 is typically bonded in the region of the spar cap 46a, 46b.

Figure 4:
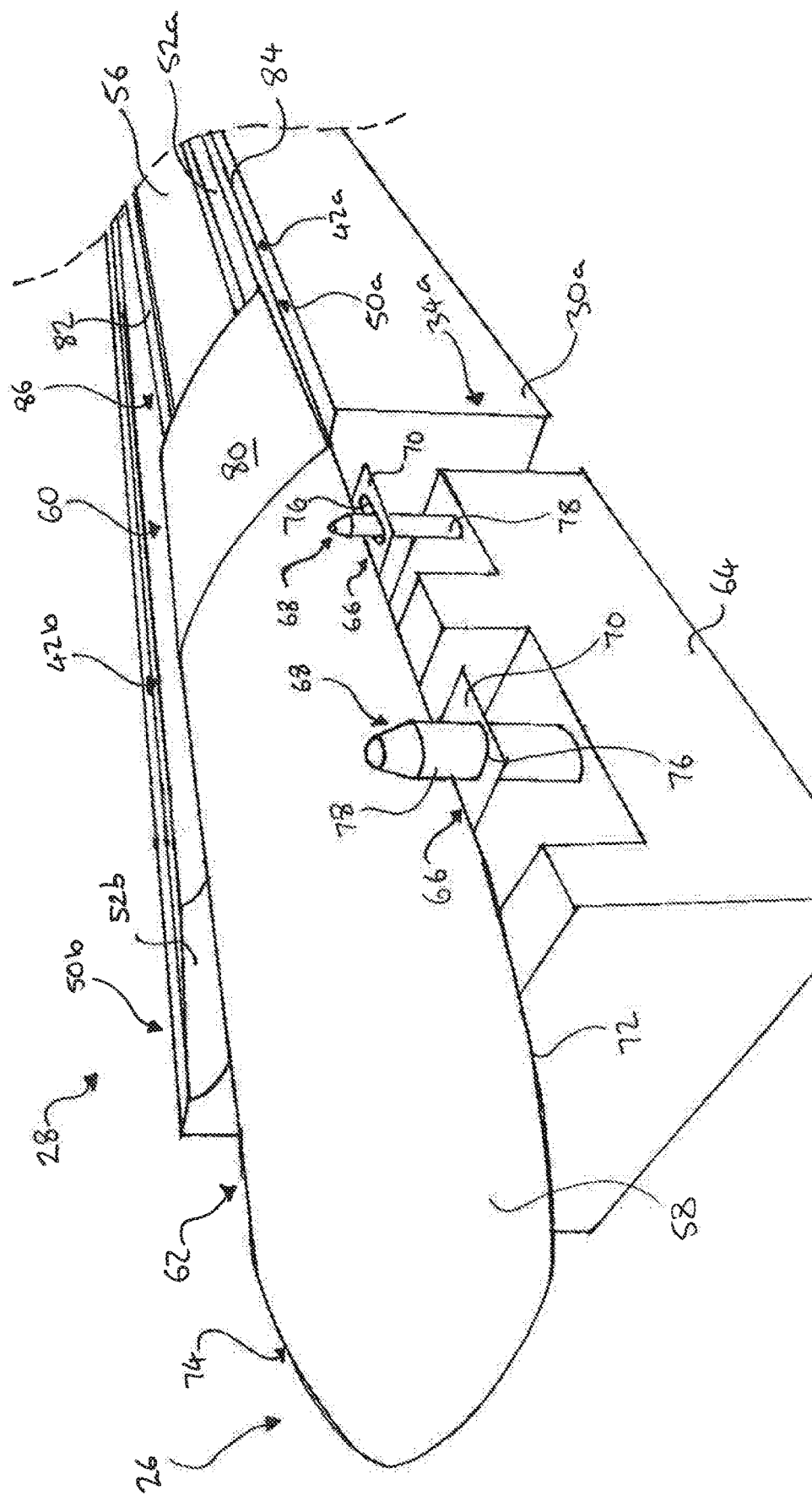
FIG. 4 is a schematic perspective view of a tip section arranged adjacent to an outboard end of the first main mould half.

Referring now to FIG. 4, after making the main blade half shells 42a, 42b, a pre-manufactured tip section 26 is selected for integration with the main blade half shells 42a, 42b. The tip section 26 is selected from a plurality of available tip sections of different lengths according to the overall length requirement of the blade 12. The length of the tip section 26 may be selected based upon site-specific factors of the proposed wind turbine site. For example, if the blade 12 is to be fitted to a wind turbine 10 in a location where wind speed is expected to be relatively low, a pre-manufactured tip section 26 with a relatively long length may be selected. The selected tip section 26 forms a relatively long blade 12 which results in a greater swept area of the rotor 18 and therefore more energy harnessed from the wind. Conversely, if the blade 12 is to be fitted to a wind turbine 10 in a location where wind speed is expected to be relatively high, a tip section 26 with a relatively shorter length may be selected. An assessment of wind conditions for a specific location may for example be performed using a computer-aided simulation or using measurements taken at the proposed wind turbine site.

The tip section 26 in this example comprises an outer shell 58 defining a substantially hollow interior region. The outer shell 58 is preferably formed of a similar composite laminate structure to the first and second main blade section half shells 42a, 42b. For example, the outer shell 58 of the tip section 26 may be formed from glass and/or carbon fibre in a cured resin matrix. The tip section 26 may further comprise a shear web and spar caps. If spar caps are included in the tip section 26, these preferably have the same structure as the spar caps 46a, 46b of the main blade section 24. For example, the spar caps may be formed from stacks of CFRP pultrusions embedded within the laminate shell structure of the outer shell 58. The tip section 26 further comprises a tapered inboard end 60 configured to mate with the tapered outboard ends 50a, 50b of the main blade section half shells 42a, 42b.

As shown in FIG. 4, the selected tip section 26 is arranged adjacent to the outboard end 34a of the first main mould half 30a. The tapered inboard end 60 of the tip section 26 overlaps the tapered outboard end 50a of the first main blade section half shell 42a and is supported by the outboard end 34a of the first half mould 30a. An outboard end 62 of the tip section 26 extends beyond the outboard end 34a of the first half mould 30a.

The outboard end 62 of the tip section 26 is supported relative to the first main blade section half shell 42a and first half mould 30a by a support structure 64. The support structure 64 is separate from the first main mould half 30a, in that it is not utilised in the process of making the main blade section 24. In this example the support structure 64 is not connected to the main blade mould assembly 28, but in other examples the separate support structure 64 may be attached to or integral with the main blade mould assembly 28. The tip section 26 and the support structure 64 may each comprise corresponding datum features 66, 68 to ensure accurate alignment of the tip section 26 relative to the main blade section 24. In this example, the tip section 26 includes tabs 70 that project from leading and trailing edges 72, 74 of the tip section 26. The tabs 70 each include a hole 76. The support structure 64 includes poles 78 that are inserted through the holes 76 in the tabs 70. The tabs 70 are removed from the tip section 26 after the blade 12 has been formed. The support structure 64 may have a plurality of datum features 68 to align a plurality of different length tip sections 26 with the main blade section mould assembly 28.

Prior to arranging the tip section 26, adhesive (not shown) is provided on the inner surface 52a at the outboard end 50a of the first half shell 42a. The tip section 26 is arranged such that the tapered inboard end 60 of the tip section 26 is on top of this adhesive. Alternatively or additionally, this adhesive may be provided directly on the inboard end 60 of the tip section 26. A shear web in the tip section 26 may then be connected to the shear web 56 in the main blade section 24 by any suitable means such as adhesive bonding, mechanical fasteners e.g. bolts, or laminating over the joint between the shear webs.

Further adhesive (not shown) is then provided on the inner surface 52b of the outboard end 50b of the second main half shell 42b. Alternatively or additionally, this adhesive may be provided directly on the tapered inboard end 60 of the tip section 26 (e.g. on the upper surface 80 of the tip section 26 in the orientation shown in FIG. 4). At this stage, adhesive may also be applied to a surface of the shear web 56 to be bonded to the second half shell 42b (e.g. along the upper edge 82 of the shear web 56 as shown in FIG. 4). Further adhesive (not shown) is also applied along leading and trailing edges 84, 86 of the first and/or second main half shells 42a, 42b. This adhesive serves to bond the first and second half shells 42a, 42b together when the mould 28 is closed.

Figure 5:
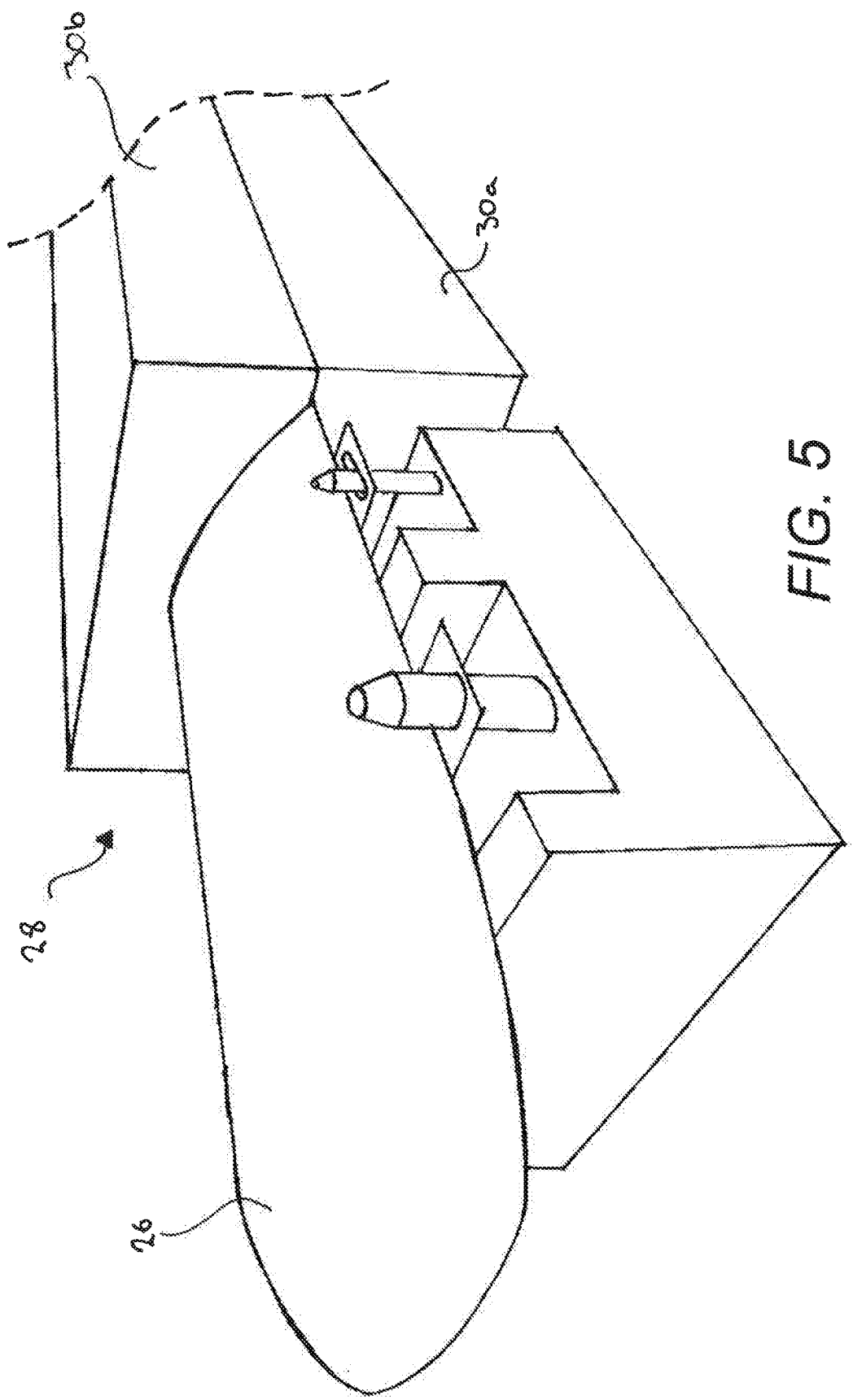
FIG. 5 is a schematic perspective view of the main blade mould assembly in a closed position.

Referring additionally to FIG. 5, the next stage of the manufacturing method comprises closing the main mould assembly 28. Typically the mould assembly 28 is provided with a turning mechanism that enables one of the mould halves 30a, 30b to be lifted, turned and positioned on top of the other mould half 30a, 30b. In this example, the second mould half 30b is lifted and positioned on top of the first mould half 30a. The second main half shell 42b (shown in FIG. 3) is therefore arranged on top of the first main half shell 42a (shown in FIG. 3). The tapered inboard end 60 (see FIG. 4) of the tip section 26 is consequently sandwiched between the tapered outboard ends 50a, 50b of the first and second half shells 42a, 42b when the mould 28 is closed.

With the mould 28 in the closed position, the adhesive previously applied to the various components is compressed under the weight of the second half shell 42b and the second mould half 30b. Once this adhesive has hardened the various components are firmly bonded together. In particular the first and second main half shells 42a, 42b are bonded together and simultaneously the tip section 26 is bonded to the first and second half shells 42a, 42b. At the same time, the shear web 56 is also bonded between respective inner surfaces 52a, 52b of the first and second main blade section half shells 42a, 42b.

In this example, the tapered inboard end 60 of the tip section 26 forms a cup and cone bonded joint with the main blade section 24. The inboard end 60 of the tip section 26 tapers in a reverse direction to the outboard end 50a, 50b of the main blade section 24. The cup and cone joint is effectively a scarf joint that extends around the perimeter of the inboard end 60 of the tip section 26 and the outboard end 50a, 50b of the main blade section 24. This joint forms a very robust and stable connection between the tip section 26 and the main blade section 24.

The tip section 26 may include various components to improve performance and safety of the wind turbine blade 12 such as a shear web, lightning-protection components, anti-icing components or de-icing components. These components are pre-installed in the tip section 26 prior to arranging the tip section 26 relative to the first main half shell 42a. Therefore the tip section 26 is provided as a pre-manufactured component that can be arranged in a simple manner with the main blade section 24. Preferably the tip section 26 further comprises the tip 36 of the wind turbine blade 12, however it is also anticipated that that a separate tip component may be attached to the tip section 26 to form the blade tip 36.

The tip section 26 may be premanufactured using a dedicated tip mould 88 having a size corresponding to the required length of the tip section 26. Accordingly, the blade manufacturing facility may include a plurality of dedicated tip moulds 88 each of different lengths. As the tip section 26 may constitute a relatively small proportion of the overall blade length (e.g. up to 30%), it is economically efficient to produce a range of tip moulds 88 of different lengths. It is much cheaper to produce a plurality of tip moulds 88 of different lengths than to produce a range of full-length blade moulds of different lengths. The tip moulds 88 also have a much smaller footprint and therefore occupy a relatively small area of the factory.

Figure 6:
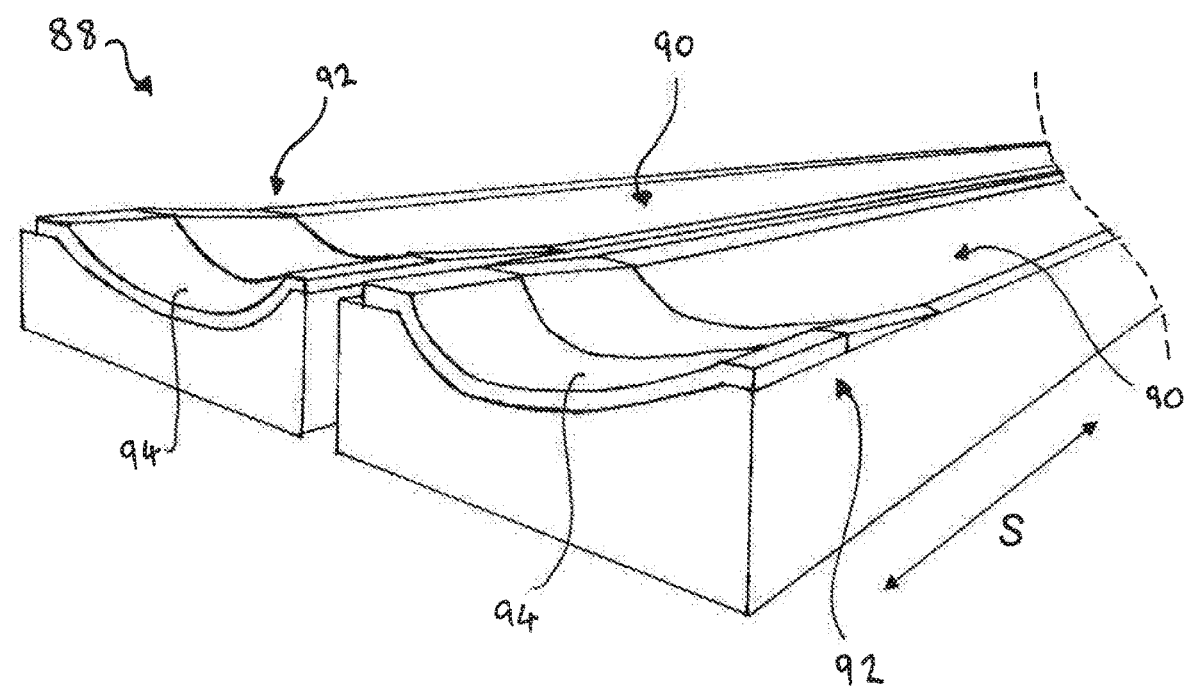
FIG. 6 is a schematic perspective view of a tip section mould assembly comprising moveable mould plants.
Figure 7A:
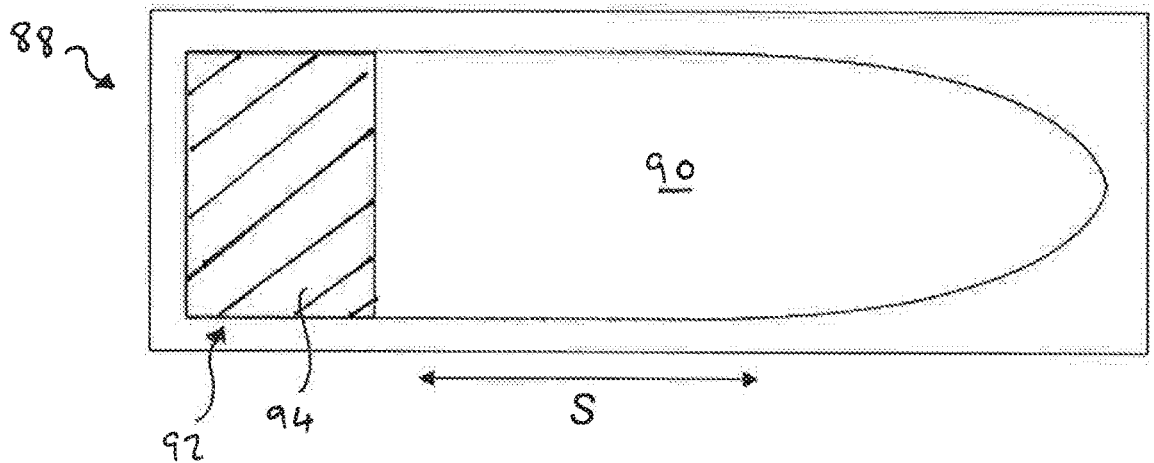
FIGS. 7a to 7c are schematic plan views of a tip mould illustrating how the tip mould can be used to produce tip sections of different lengths.
Figure 7B:
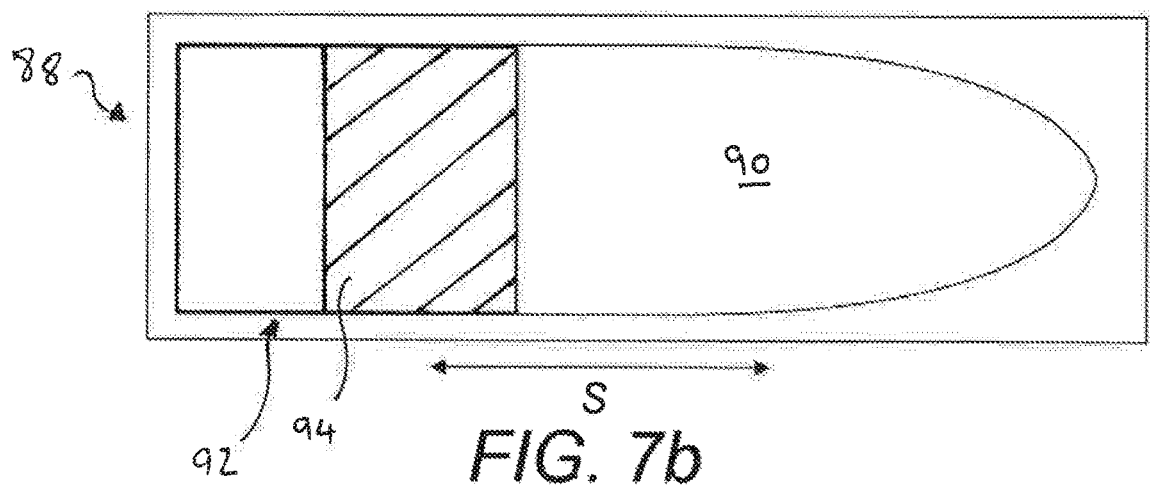
Figure 7C:
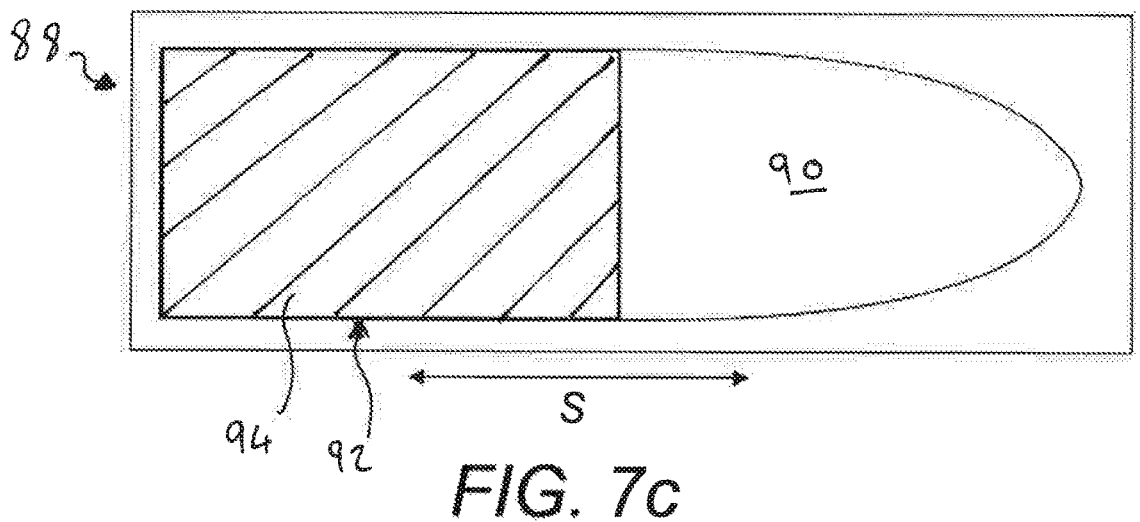

Alternatively, as shown in FIGS. 6 to 7c, a single adjustable tip mould 88 can be used to form tip sections 26 of a variety of different lengths in accordance with a total length requirement for the wind turbine blade 12. The adjustable tip mould 88 shown in FIGS. 6 to 7c comprises a shell layup area 90 with an inboard spanwise section 92 of substantially constant dimensions. A plant 94 is arranged in the aforementioned inboard spanwise section 92 to enable the length of the effective shell layup area 90 to be adjusted. By varying the size or position of the plant 94 in the spanwise section 92 it is possible to produce tip sections 26 for a wind turbine blade 12 of varying lengths in a single mould 88.

FIGS. 7a to 7c show more clearly how the effective shell layup 90 area is adjusted by varying the size or position of the plant 94 in the spanwise section 92 of the mould 88. In FIG. 7a a relatively small plant 94 is arranged to leave a relatively large effective layup area 90 to form a relatively long blade tip section 26. In FIG. 7b, the plant 94 is moved in the spanwise direction S to define a shorter effective layup area 90 in comparison to FIG. 7a. Consequently, the tip mould in FIG. 7b is set up to form a shorter tip section than the tip mould set up in FIG. 7a. FIG. 7c illustrates the use of a relatively large plant 94 that occupies a majority of the inboard section 92 of the tip mould 88. Consequently, a relatively short layup area 90 is defined. The tip mould 88 in FIG. 7c is therefore set up to make a shorter tip section than the tip mould set up shown in FIGS. 7a and 7b.

In each of the examples 7a-7c, the shell layup area 90 has the same dimensions at its inboard end because the inboard spanwise section 92 of the mould tool 88 has substantially constant dimensions. Consequently, although the three tip sections produced using the mould arrangements 88 of FIGS. 7a-7c would have different lengths, they would all have the same dimensions at their inboard end, which interfaces with the main blade section. Therefore, the joint formed between the main blade section 24 and tip section 26 would be substantially identical for tip sections of any length.

Using the methods and apparatuses described above it is therefore possible to manufacture wind turbine blades 12 having a length that is optimised for the wind conditions at a specific site in an efficient and cost-effective manner. A single main blade mould assembly 28 may be used to form blades 12 of different lengths by incorporating pre-manufactured tip sections 26 during the process of producing the blade 12. The main blade mould assembly 28 is very expensive and occupies a significant area of the factory. It is therefore highly advantageous that the same main mould 28 can be used to produce blades 12 of different lengths.

The tip mould assembly is separate to the main blade mould assembly 28, which allows the tip sections 26 to be formed off-line, either before manufacturing the main blade section 24 or in parallel. In some cases a plurality of tip moulds of different lengths may be required. However, as the tip moulds are significantly smaller than the main blade mould 28, they are cheaper to produce and occupy less floor space in the factory. Accordingly, this solution presents significant advantages over the alternative of having multiple full-length blade moulds of different lengths.

Further benefits arise from having an adjustable tip mould 88, such as that described in relation to FIGS. 6-7c. In such cases, a single tip mould 88 can be used to produce tip sections 26 of different lengths, hence blades 12 of different overall length can be produced using just one main blade mould 28, and one adjustable tip mould 88. The tooling costs may therefore be further reduced, and the factory floor space required may be minimised.

By integrating the tip section 26 with the main blade section 24 during manufacture of the wind turbine blade 12, further advantages arise. In particular, a very strong joint can be formed between the main blade section 24 and the tip section 26 because adhesive can be placed accurately between the tip section 26 and main blade half shells 42a, 42b when the main blade mould assembly 28 is open and all the bonding surfaces are readily accessible. Accordingly, a more robust and durable joint can be obtained in comparison to modular blade joints where the two sections of a blade are only joined together after both sections have been manufactured. In such cases, the bonding surfaces are not generally accessible. Further advantages arise from integrating the tip section 26 with the main blade half shells 42a, 42b during blade manufacture, since the process may be conducted in a factory setting, where conditions can be carefully controlled and lifting and monitoring equipment is readily available.

Many modifications may be made to the examples described above without departing from the scope of the present invention as defined in the accompanying claims.

The invention claimed is:

1. A method of making a wind turbine blade having a main blade section and a tip section connected together, the method comprising:

providing a main blade mould assembly comprising first and second female main mould halves shaped to form first and second half shells of the main blade section respectively, each main mould half having an inboard end shaped to define a radially inboard portion of the main blade section and an outboard end shaped to define a radially outboard portion of the main blade section, the main blade mould assembly having an open position in which the main mould halves are spaced apart, and a closed position in which the main mould halves are brought together;

forming a first half shell of the main blade section in the first main mould half and forming a second half shell of the main blade section in the second main mould half with the main blade mould assembly in the open position;

selecting a tip section from a plurality of tip sections of different lengths according to a total length requirement for the wind turbine blade;

arranging the tip section adjacent to the outboard end of the first main mould half such that an inboard end of the tip section and an outboard end of the first half shell overlap;

closing the main mould assembly such that the first and second half shells are brought together and such that the inboard end of the tip section and an outboard end of the second half shell overlap; and bonding the first and second half shells together and simultaneously bonding the inboard end of the tip section to the outboard ends of the first and second half shells with the main mould assembly in the closed position.

2. The method of claim 1, comprising arranging the tip section such that the inboard end of the tip section is supported by the outboard end of the first mould half and such that an outboard end of the tip section extends beyond the outboard end of the first mould half.

3. The method of claim 2, further comprising supporting the outboard end of the tip section relative to the first main mould half using a support structure that is preferably separate from the first main mould half.

4. The method of claim 3, wherein the tip section and the support structure each comprise datum features and the method further comprises aligning and/or engaging the datum features of the tip section with the datum features of the support structure to ensure a correct alignment between the tip section and the first half shell.

5. The method of claim 1, wherein the outboard ends of the first and second main mould halves are truncated in comparison to a conventional blade mould assembly.

6. The method of claim 1, wherein the tip section comprises an outer shell that tapers in thickness at the inboard end of the tip section, and the method further comprises:
   forming the first and second half shells such that their respective outboard ends taper in thickness; and arranging the tip section such that the tapered inboard end of the tip section and the tapered outboard end of the first half shell overlap.

7. The method of claim 1, wherein the inboard end of the tip section forms a cup and cone joint with the main blade section upon closing the main mould assembly.

8. The method of claim 1, further comprising providing adhesive on an inner surface of the outboard end of the first main half shell and arranging the inboard end of the tip section on top of the adhesive.

9. The method of claim 8, comprising providing further adhesive on an inner surface of the outboard end of the second main half shell and/or on an outer surface of the inboard end of the tip section configured to overlap the second main half shell prior to closing the main mould assembly.

10. The method of claim 1, further comprising bonding a shear web between respective inner surfaces of the first and second main half shells.

11. The method of claim 1, wherein the tip section includes one or more components selected from: a shear web, lightning-protection components, anti-icing components, de-icing components, which are pre-installed in the tip section prior to arranging the tip section relative to the first main half shell.

12. The method of claim 1, further comprising making the plurality of different tip sections in a plurality of respective tip moulds of varying length, the tip moulds being separate to the main blade mould assembly.

13. The method of claim 1, further comprising making the selected tip section using an adjustable tip mould that is adjustable to form tip sections having a variety of lengths, and wherein the method comprises configuring the adjustable tip mould to form a tip section having a length selected in accordance with the total length requirement for the wind turbine blade.

14. The method of claim 13, wherein the adjustable tip mould comprises a shell layup area having an inboard spanwise section of substantially constant dimensions, and the method of making the selected tip section comprises arranging a plant in the inboard spanwise section to adjust the effective length of the shell layup area.

* * * * *